United States Patent [19]
Wayne

[11] Patent Number: 5,159,314
[45] Date of Patent: Oct. 27, 1992

[54] HOODSCOOP ASSEMBLY FOR GOLF CART

[76] Inventor: Mark Wayne, 29436 Briarbank Ct., Southfield, Mich. 48034

[21] Appl. No.: 638,365

[22] Filed: Jan. 4, 1991

Related U.S. Application Data

[63] Continuation-in-part of Ser. No. 519,286, May 4, 1990, and a continuation-in-part of Ser. No. 308,810, Feb. 9, 1989, Pat. No. 4,996,442, which is a continuation-in-part of Ser. No. 201,328, May 27, 1988, abandoned, which is a continuation-in-part of Ser. No. 4,616, Jan. 20, 1987, abandoned.

[51] Int. Cl.⁵ .................. B60Q 1/00; B62D 25/10
[52] U.S. Cl. .................... 340/461; 340/472; 364/708; 455/89; 455/90; 455/99; 455/347; 180/69.2
[58] Field of Search ............ 340/468, 461, 472, 473; 362/80, 83.3; 180/68.3, 69.2; 296/91; 455/89, 90, 99, 347; 364/708

[56] References Cited

U.S. PATENT DOCUMENTS

| | | | |
|---|---|---|---|
| 3,110,882 | 11/1963 | Stuerzl et al. | 340/461 |
| 3,944,924 | 3/1976 | Miyachi | 455/345 |
| 4,040,656 | 8/1977 | Clenet | 296/91 |
| 4,043,587 | 8/1977 | Giallourakis et al. | 296/91 |
| 4,445,228 | 4/1984 | Bruni | 455/345 |
| 5,001,779 | 3/1991 | Eggert et al. | 455/347 |

Primary Examiner—Donnie L. Crosland
Attorney, Agent, or Firm—Gifford, Groh, Sprinkle, Patmore and Anderson

[57] ABSTRACT

A hoodscoop assembly for fixed or removable attachment to a golf cart. The hoodscoop assembly may have a rear facing surface visible to the driver. The hoodscoop may have situated thereon, either alone or in combination, a mobile telephone, a paging unit, a computer for score keeping, a two-way radio, and a clip for holding papers or score cards. The hoodscoop is made removable by hook and loop fasteners. Clips may be employed for permanent attachment. When the cart is stored, the hoodscoop is preferably removed. When the cart is rented for use, the hoodscoop may also be rented and is attached.

19 Claims, 1 Drawing Sheet

U.S. Patent     Oct. 27, 1992     5,159,314
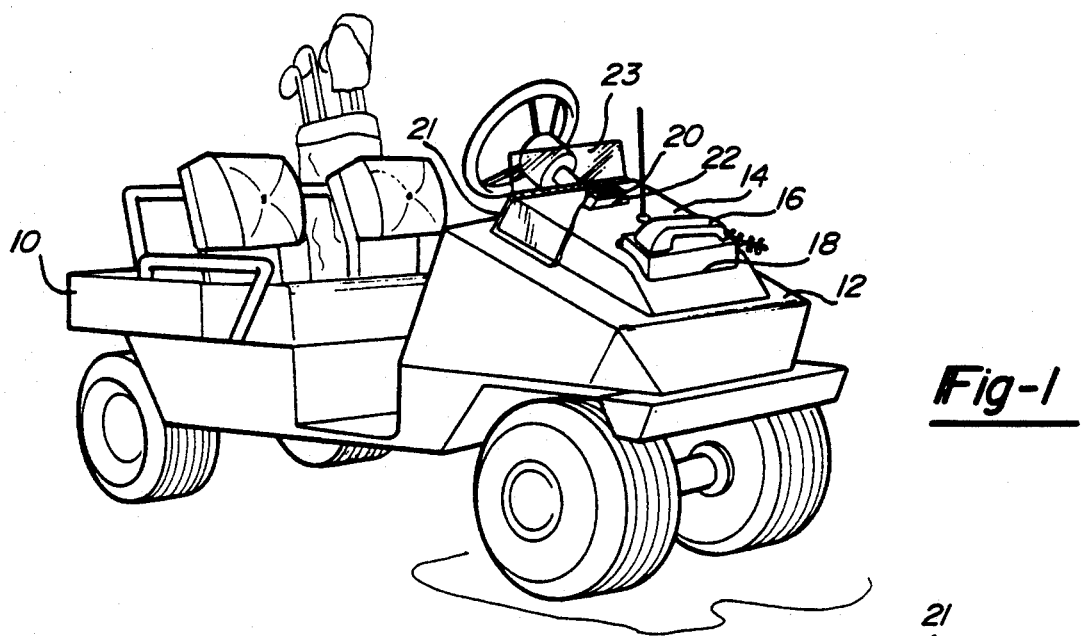
Fig-1
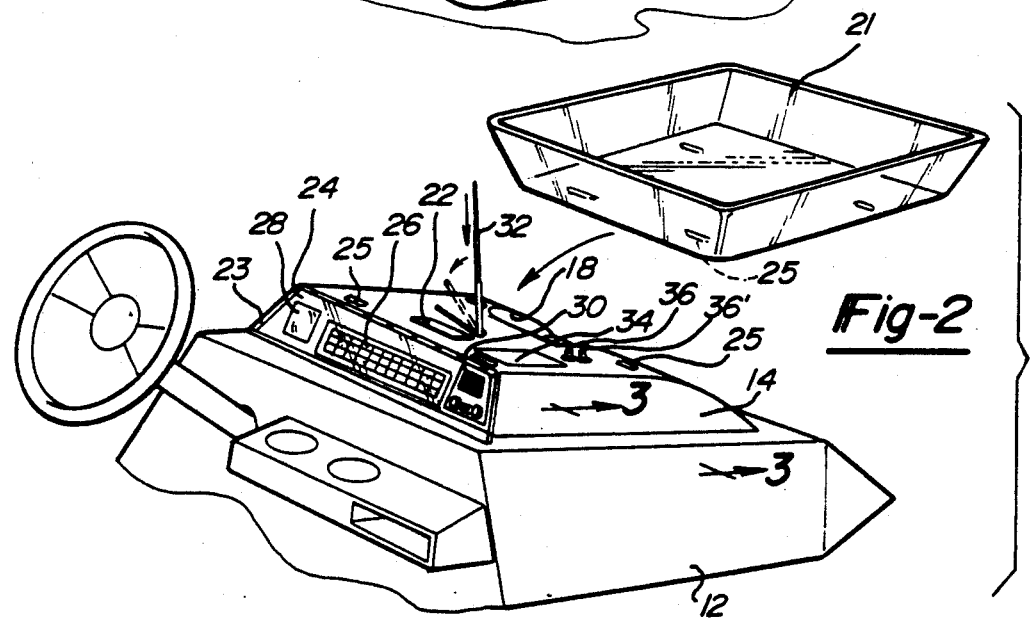
Fig-2
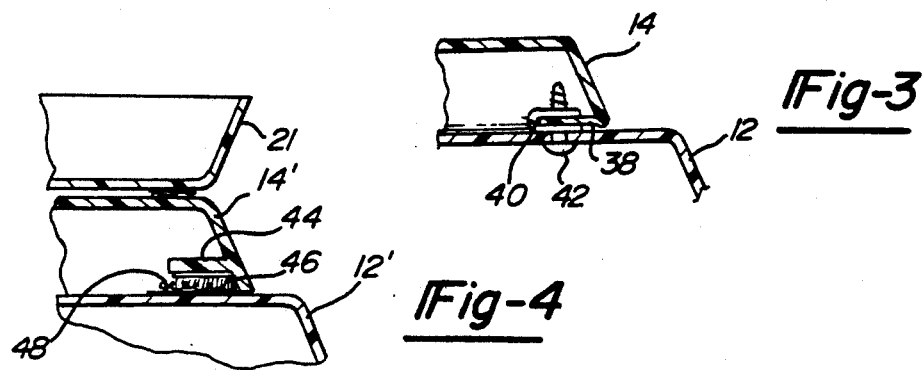
Fig-3
Fig-4

HOODSCOOP ASSEMBLY FOR GOLF CART

CROSS REFERENCE TO RELATED APPLICATIONS

The present application is a continuation-in-part of application Ser. No. 519,286 filed May 4, 1990, and a continuation-in-part of application Ser. No. 308,810 filed Feb. 9, 1989 now U.S. Pat. No. 4,996,442, which is a continuation-in-part of Ser. No. 201,328 filed May 27, 1988, abandoned, which is a continuation-in-part application of Ser. No. 004,616 filed Jan. 20, 1987 abandoned.

BACKGROUND OF THE INVENTION

I. Field of the Invention

The present invention relates to a hoodscoop assembly for fixed or removable attachment to a golf cart. The hoodscoop may include a mobile telephone, a paging unit, a computer for score-keeping, a two-way radio, and a clip for holding papers or score cards. Hook-and-loop fasteners may be employed for removable mounting of the assembly.

II. Description of the Prior Art

The resurgence of the game of golf in the last few years has repopularized not only the game itself, but also the implements generally associated with the game. Of course, these implements include not only golf clubs, but also golf balls and pull carts. Also included in this group are powered, self-propelled golf carts, either powered by gasoline engines or by electric motors.

Of course, as is well known, the powered golf cart offers the user the advantage of convenience when moving about the golf course. The golf cart becomes a virtual necessity on the so-called "long hole" courses and on most eighteen-hole courses. As such, in many instances the powered golf cart is a virtual necessity. It is this "virtual necessity" that has given cause for many people to rethink the functional utility of the golf cart. Occasionally one sees golf carts provided with beverage holders, coolers, or other places to allow the user with a more utilitarian means of moving about.

Yet for all of the development, presently-known powered golf carts still fail to allow the golfers to combine work with pleasure. In many instances golf outings are primarily directed at providing the participants the opportunity to discuss business and "make deals" outside of the office. In so doing, however, the participants in these discussions are typically isolated from the outside world while on the golf course.

Accordingly, presently-known golf carts have failed to keep pace with changing times and offer the users little more than they did when they were first used several years ago.

SUMMARY OF THE PRESENT INVENTION

The present invention overcomes many of the problems associated with known golf carts and enhances the overall utility of the golf cart by providing it with a removable hoodscoop assembly that comprises many features not otherwise available to the golfer.

The present invention includes a hoodscoop assembly for fixed or removable attachment to a golf cart. The hoodscoop may be provided on either the front or the back of the golf cart, provided that either embodiment includes a substantially flat surface upon which the attachment may be fitted. While being styled as a scoop such as that which may be found on automotive vehicles, the attachment of the present invention is best characterized as multi-functional.

The hoodscoop assembly of the present invention may be fixed to the golf cart in a permanent manner by use of clips and attaching screws, or, as a more practical and preferred embodiment, may be removably attached to the golf cart by means of hook and loop fasteners. It is this latter embodiment which provides the user with the option of either renting the assembly from the pro shop or not renting the assembly. Not every golfer wants to take his office onto the golf course.

The hoodscoop of the present invention may include a number of elements. For example, a computer may be fitted to the assembly for computing scores particularly when a number of players are involved. It may even be possible for a computer screen to show the layout of the course as taken from a card or disc which may be provided by the pro shop. The card may be inserted into the computer and the player may call up a visual display for each hole. The display may represent either a bird's eye view or a view taken from different points along the fairway.

Another accessory of the present invention may include a mobile (or cellular) telephone. The portable phone allows the player to maintain contact with anyone with whom he would normally be able to place a telephone call.

In addition to (or alternatively), a paging unit may be disposed on the attachment. Similarly, a two-way radio may also be provided for communication between the golf cart and, for example, the pro shop. Accordingly, the golf team may be paged from the pro shop, and the players may be able to communicate back and forth between themselves and the pro shop.

In addition, space may be provided for the score card and a pencil or two.

Other advantages and features of the present invention will become more apparent from the following detailed description when read in conjunction with the accompanying drawings.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which:

FIG. 1 is a perspective view illustrating the hoodscoop attachment according to the present invention in place upon a golf cart;

FIG. 2 is a perspective view illustrating a different viewpoint of the assembly of the present invention;

FIG. 3 is a view taken along line 3—3 of FIG. 2 and illustrating a method of permanently fixing the attachment of the present invention to the golf cart; and FIG. 4 is an alternate method of attachment and illustrates a hook and loop fastening method.

DETAILED DESCRIPTION OF THE PREFERRED EMBODIMENTS OF THE PRESENT INVENTION

The drawing discloses the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Referring to FIG. 1, a self-propelled golf cart, generally referred to as 10, is illustrated. The golf cart 10 typically includes a cowl portion 12 within which the users (not shown) may comfortably stretch their legs and feet. A hoodscoop assembly 14 according to the present invention is illustrated as being fitted to the cowl 12 of the cart 10. While the cowls of some carts may not be as deep as that illustrated, virtually all golf carts include a cowl of some type which could accomodate the assembly 14. If there is no cowl, the assembly 14 may be disposed upon any substantially planar surface provided on the cart 10.

The assembly 14 may be composed of a polymerized material and preferably includes one or more accessories. For example, a portable or mobile (cellular) telephone 16 may be removably inserted into a telephone-receiving saddle 18. The saddle 18 is preferably composed of a resilient foam or padding.

In addition to the telephone 16 and working in harmony therewith, a pager 20 may be removably diposed within a slot 22 defined in the top side of the assembly 14. In practice, an employee of the golf course may receive a call at the club house for a golfer who is on the course. The employee pages the particular golfer on the pager 20, and the golfer may return the call using the telephone 16.

A molded cover 21 may be provided as an option to shield the assembly 14 from inclement or wet weather. The cover 21 is preferably composed of a clear polymerized material.

A shield 23 may be hingedly fixed to the back end of the assembly 14 or may be fitted to the back end of the cover 21. The purpose of the shield 23 is to keep rain and moisture away from the electronics, described more fully with respect to FIG. 2.

FIG. 2 illustrates an alternate view of the assembly 14 situated on the cowl 12 of the golf cart 10. Taken from this view, a backward-facing plate 24 may be seen as being disposed upon the assembly 14.

Upon the plate 24 or disposed on the assembly 14 in alternate place equally convenient to the operator a game computer 26 may be provided. The computer 26 may be directed to a variety of uses. For example, the computer 26 may be used to keep track of scores, which is particularly valuable when a relatively large number of players are involved. The computer 26 may be very useful in keeping track of the more complex scoring involved in match play. If the golfers are repeat players on the course, a disc or card may be employed which includes prior game scores against which the players may compare their current scores. In any event, a small monitor 28 is provided to accomodate visual display of pertinent information.

Anticipated uses of the computer 26 are also considered. These applications may include a display of the fairway as seen from the golfer's perspective at different distances down the fairway, thus giving the golfer an idea of the immediate environment even before he arrives.

Another use may include providing the computer 26 with range finder sensors or sensors that can read emitting devices implanted in the fairway at intervals of a certain number of yards. This feature allows for the golfer to "read" the distance to the flag from wherever the golf cart is stopped on the fairway.

In addition to the features of a cellular telephone 16, a pager 20, and a computer 26, the assembly 14 may also be provided with a two-way radio 30 that allows communication among players and between players and the club house. The radio 30 utilizes an antenna 32. A score card pad 34 may be provided to accomodate a score card. One or more pencil holders 36, 36' may also be provided for holding pencils for marking the score card.

The assembly 14 may be removably attached to the cowl 12 or may be permanently mounted. FIG. 3 demonstrates permanent mounting while FIG. 4 shows removable mounting.

FIG. 2 also illustrates the molded cover 21 in an upside-down position for attachment to the top side of the assembly 14. In this position, the cover 21 serves as a tray, and can accomodate golf balls, tees, markers, pencils, score cards and the like. Attachment is accomplished by removable binding through a plurality of hook and loop fasteners 25 provided on the top side of the assembly 14 and the top of the cover 21.

The shield 23 covers the computer 26. As illustrated, it is hingedly fitted to the assembly 14. Alternatively, it may be hingedly fitted to the cover 21.

With reference to FIG. 3, a sectional view taken along line 3—3 of FIG. 2 is illustrated. The assembly 14 is shown fastened to the cowl 12. A flange 38 extends inwardly from the wall of the assembly 14, and a metal V-shaped clip 40 is fixed to the flange 38. A screw 42 is threaded through the cowl 12 into the clip.

While the permanent embodiment of FIG. 3 may be preferred where overnight cart storage is available, it may be desired that the assembly to be removed from the cart 10. FIG. 4 illustrates this embodiment.

Illustrated in FIG. 4 is an assembly 14' fitted to a cowl 12'. A flange 44 extends from the wall of the assembly 14', and has provided on its underside hook fastener 46. The top side of the cowl 12' has provided thereon loop fastener 48. (Of course, a loop fastener may be fitted on the underside of the flange 44 and a hook fastener may be fitted on the cowl 12'.) The hook and loop fastening system allows for convenient removal and reattachment of the assembly 14' from the cowl 12'. This embodiment is preferred when the cart 10 is left out of doors for extended periods of time. The golfer then has the option of renting the cart 10 with or without the assembly.

Having described my invention, however, many modifications thereto will become apparent to those skilled in the art to which it pertains without deviation from the spirit of the invention as defined by the scope of the appended claims.

I claim:

1. An assembly for use with a vehicle having a passenger compartment and an external hood portion extending forward of said passenger compartment, said assembly comprising:
    a body, said body having a top side, a bottom side, a front end and a back end;
    a self-contained telecommunications unit fitted to said body; and
    means for releasably attaching an underside of said body to the external hood portion extending forward of the passenger compartment of a vehicle, said attaching means comprising a fastener.

2. The assembly according to claim 1 wherein said telecommunication unit is removably attachable to said body.

3. The assembly according to claim 1 wherein said telecommunication unit comprises a paging device.

4. The assembly according to claim 1 wherein said telecommunication unit comprises a mobile telephone.

5. The assembly according to claim 1 wherein said telecommunication unit comprises a two-way radio.

6. The assembly according to claim 1 wherein said body includes a computer.

7. The assembly according to claim 1 wherein said body includes a pad for removably receiving a score card.

8. An assembly for use with a vehicle having a passenger compartment and an external hood portion extending forward of said passenger compartment, said assembly comprising:
   a body, said body having a top side, a bottom side, a front end, and a back end;
   a self-contained telecommunication unit fitted to said body; and
   means provided on said underside of said body for releasably attaching said assembly to the external hood portion extending forward of the passenger compartment of a vehicle.

9. The assembly of claim 8 wherein said body is removably attached to a cart.

10. The assembly of claim 9 wherein said telecommunication unit is removably attached to said body.

11. An assembly for use with a vehicle having a passenger compartment and an external hood portion extending forward of said passenger compartment, said assembly comprising:
   a body, said body having a top side, a bottom side, a front end and a back end;
   means for releasably attaching said body to said vehicle;
   said body having a fitting for placement of a self-contained accessory;
   a removable cover composed of a resilient material;
   said cover having a top; and
   means for removably attaching said top of said cover to said top side of said body when said cover is inverted to provide an article-supporting surface.

12. The assembly according to claim 11 further including a shield hingedly attached to said cover.

13. The assembly of claim 11 wherein said body includes a computer.

14. The assembly of claim 11 wherein said body includes a telecommunication unit.

15. The assembly of claim 14 wherein said telecommunication unit is removably attachable to said body.

16. The assembly of claim 14 wherein said telecommunication unit comprises a paging unit.

17. The assembly according to claim 14 wherein said telecommunication unit comprises a mobile telephone.

18. The assembly according to claim 14 wherein said telecommunication unit comprises a two-way radio.

19. The assembly according to claim 11 wherein said body includes a pad for removably receiving a score card.

* * * * *